(12) United States Patent
Hendrickson et al.

(10) Patent No.: US 10,961,893 B2
(45) Date of Patent: Mar. 30, 2021

(54) SYSTEMS AND METHODS FOR PARTICULATE FILTER REGENERATION

(71) Applicant: Ford Global Technologies, LLC, Dearborn, MI (US)

(72) Inventors: Cory Hendrickson, Ann Arbor, MI (US); Devesh Upadhyay, Canton, MI (US); Michael Brendan Hopka, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 16/112,172

(22) Filed: Aug. 24, 2018

(65) Prior Publication Data

US 2020/0063632 A1 Feb. 27, 2020

(51) Int. Cl.
*F01N 9/00* (2006.01)
*F01N 3/029* (2006.01)

(52) U.S. Cl.
CPC .......... *F01N 9/002* (2013.01); *F01N 3/0296* (2013.01); *F01N 2900/08* (2013.01); *F01N 2900/102* (2013.01); *F01N 2900/1402* (2013.01); *F01N 2900/1606* (2013.01); *F01N 2900/1811* (2013.01); *F01N 2900/1814* (2013.01)

(58) Field of Classification Search
CPC .... F01N 3/208; F01N 13/009; F01N 2610/02; F01N 3/035; F01N 9/002; F01N 2560/026; F01N 2900/1402; F01N 2900/1622; F01N 3/0231; F01N 3/106; F01N 3/2066; F01N 11/007; F01N 13/0093; F01N 2510/06; F01N 2550/02; F01N 2560/14; F01N 2570/14; F01N 2570/18; F01N 2900/0408; F01N 2900/0412; F01N 2900/08; F01N 2900/10; F01N 2900/102; F01N 2900/1404; F01N 2900/1411; F01N 2900/1606; F01N 2900/1621; F01N 2900/1812; F01N 3/023; F01N 3/0232; F01N 3/0253; F01N 3/0842; F01N 3/2073; F01N 9/005; F02D 41/029; F02D 2041/1469; F02D 2200/0812; F02D 41/025; F02D 41/0275; F02D 41/1463; F02D 41/3836; F02D 41/401

See application file for complete search history.

(56) References Cited

U.S. PATENT DOCUMENTS

| 8,392,091 | B2 | 3/2013 | Hebbale et al. |
| 9,732,646 | B2 | 8/2017 | Upadhyay et al. |
| 2008/0314031 | A1 | 12/2008 | Shamis et al. |
| 2011/0023462 | A1* | 2/2011 | Kurtz ................... F01N 3/0842 60/286 |

(Continued)

FOREIGN PATENT DOCUMENTS

FR 3061515 A1 * 7/2018 ............. F01N 9/002

OTHER PUBLICATIONS

English translation of FR3061515 (Year: 2018).*

*Primary Examiner* — Anthony Ayala Delgado
(74) *Attorney, Agent, or Firm* — Geoffrey Brumbaugh; McCoy Russell LLP

(57) ABSTRACT

Methods and systems are provided for regenerating an exhaust particulate filter based on a projected vehicle drive cycle and catalyst ammonia storage level. In one example, a method may include scheduling a PF regeneration during a regeneration window to maintain a threshold ammonia level in an exhaust catalyst, at the end of the drive cycle.

18 Claims, 5 Drawing Sheets

(56) References Cited

U.S. PATENT DOCUMENTS

| | | | |
|---|---|---|---|
| 2015/0330275 A1* | 11/2015 | Mikami | F01N 3/208 60/285 |
| 2016/0326934 A1 | 11/2016 | Kim | |
| 2017/0122178 A1 | 5/2017 | Hatta et al. | |
| 2019/0093538 A1* | 3/2019 | Szczepanski | F01N 9/002 |
| 2019/0178187 A1* | 6/2019 | Smith | F01N 3/208 |

* cited by examiner

SYSTEMS AND METHODS FOR PARTICULATE FILTER REGENERATION

FIELD

The present description relates generally to methods and systems for controlling a vehicle engine to perform regeneration of a particulate filter based on a predicted vehicle drive cycle and a catalyst ammonia storage level.

BACKGROUND/SUMMARY

Emission control devices, such as particulate filters (PF) and selective catalytic reduction (SCR) catalysts, may reduce the amount of soot and NOx emissions from an engine by trapping soot particles and reducing NOx to nitrogen and water, respectively. For reduction of NOx, the presence of a reducing agent such as ammonia is desired. Particulate filters may be regenerated during operation of the engine, to decrease the amount of trapped particulate matter. Regeneration may be achieved by raising a temperature of the PF to a predetermined level, maintaining the temperature at the predetermined level, and ensuring that exhaust gas entering the PF is of a certain composition in order to burn or oxidize the particulate matter.

Various approaches are provided for opportunistic regeneration of particulate filters. In one example approach, as shown in U.S. Pat. No. 9,732,646, a method may include determining initiation of regeneration, termination of regeneration, and a degree of regeneration based on information from a lead vehicular network and navigation information in order to reduce a regeneration fuel penalty. By opportunistically performing regenerations by taking in to account information from external networks, the frequency of premature regeneration terminations may be reduced, and efficiency of partial regeneration opportunities may be identified and improved.

However, the inventors herein have recognized potential disadvantages with the above approach. As one example, during a PF regeneration, due to increased PF temperature, there may be reduction in ammonia storage capacity at a SCR catalyst (located upstream or downstream of the PF) which may affect the catalyst's NOx reduction capabilities during the current the drive cycle. Due to the decreased ammonia storage capacity, there may be increased possibility of ammonia slip at the initiation of PF regeneration. If the PF regeneration is scheduled to be terminated at the end of a current drive cycle, a lower than desired amount of ammonia may remain in the SCR catalyst during an immediately subsequent engine start, thereby adversely affecting emissions quality. The higher exhaust temperature during PF regeneration may result in increased urea injector temperatures which may cause degradation of the injectors.

The inventors herein have recognized that the issues described above may be addressed by an engine method comprising: selectively regenerating a diesel particulate filter (DPF) coupled to an exhaust passage based on a soot load, a predicted time to reach a destination, and a predicted ammonia level at a selective catalytic reduction (SCR) catalyst at the predicted time of reaching the destination. In this way, by opportunistically scheduling initiation and termination of PF regeneration based on predicted vehicle operating conditions and ammonia storage level, catalyst functionality and emissions quality may be improved.

As one example, a control system of the vehicle may be coupled to external networks (cloud) including each of a vehicle navigation system linked to a global positioning system providing travel route information and location information, and a vehicle-to-vehicle network including a group of vehicles travelling ahead of the target vehicle and within a threshold distance. The upcoming route during the current drive cycle and a time to reach the destination may be predicted based on information received from the external networks. In response to a soot load greater than a threshold amount, opportunistic regeneration parameters including a regeneration factor and a PF fill factor under current vehicle operating conditions may be determined. The regeneration factor may be based on fuel consumption costs during DPF regeneration whereas the PF fill factor may be based on fuel consumption costs associated with increased exhaust back pressure with an increase in PF soot load. In response to the cost of regeneration decreasing below the cost of filling, a plurality of possible PF regeneration initiation times may be estimated. A weighted PF regeneration factor associated with regeneration of PF starting at a possible PF regeneration initiation time may be estimated based on the effect of PF soot load on engine operation, fuel consumption, and emissions quality during the regeneration. PF regeneration may be initiated at a time corresponding to a lowest estimated weighted PF regeneration factor. An ammonia storage level may be predicted at the end of the drive cycle, and if the predicted ammonia storage level is lower than a calibrated threshold, regeneration may be terminated prior to the end of the drive cycle. Also, if a temperature of a urea injector coupled upstream of an exhaust catalyst increases to above a threshold temperature during or immediately after the PF regeneration, the regeneration may be terminated. Further, prior to initiation of PF regeneration, one or more of an injection limit of the urea injector and an ammonia storage set point of the exhaust catalyst may be adjusted.

In this way, by adjusting PF regeneration timing based on ammonia content in an exhaust SCR catalyst, emissions quality may be improved during and prior to the PF regeneration, and also during an immediately subsequent engine start. By adjusting one or more of a urea injection limit and an ammonia storage set point prior to initiation of PF regeneration, NOx reduction at the SCR catalyst prior to the regeneration may be increased and also the possibility of ammonia slippage during PF regeneration may be reduced. The technical effect of initiating PF regeneration at a time corresponding to a lowest weighted PF regeneration factor is that fuel efficiency, and emissions quality may be improved during the PF regeneration. By terminating PF regeneration in response to a modeled urea injector temperature increasing to a threshold temperature, hardware of the urea injector may be protected from degradation. Overall, by opportunistically timing the PF regeneration based on a predicted drive cycle duration, ammonia storage level, and PF temperature, engine efficiency, system robustness, and emissions quality may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
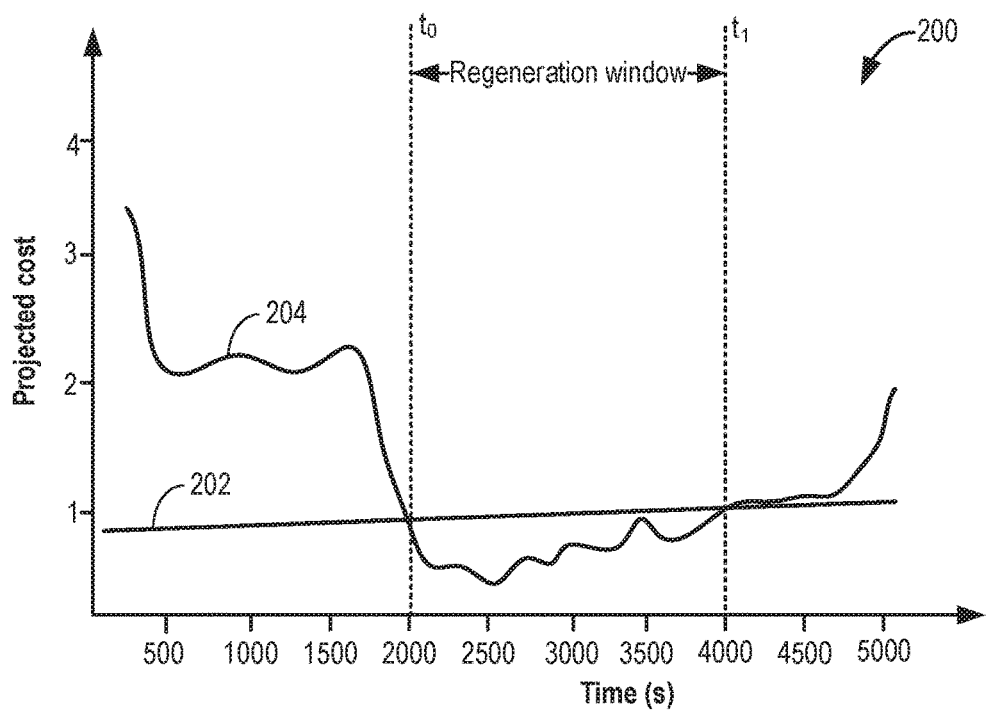
FIG. 2 shows an example graph illustrating estimated cost associated with DPF regeneration and DPF filling during a drive cycle of a vehicle including the engine shown at FIG. 1.
Figure 3:
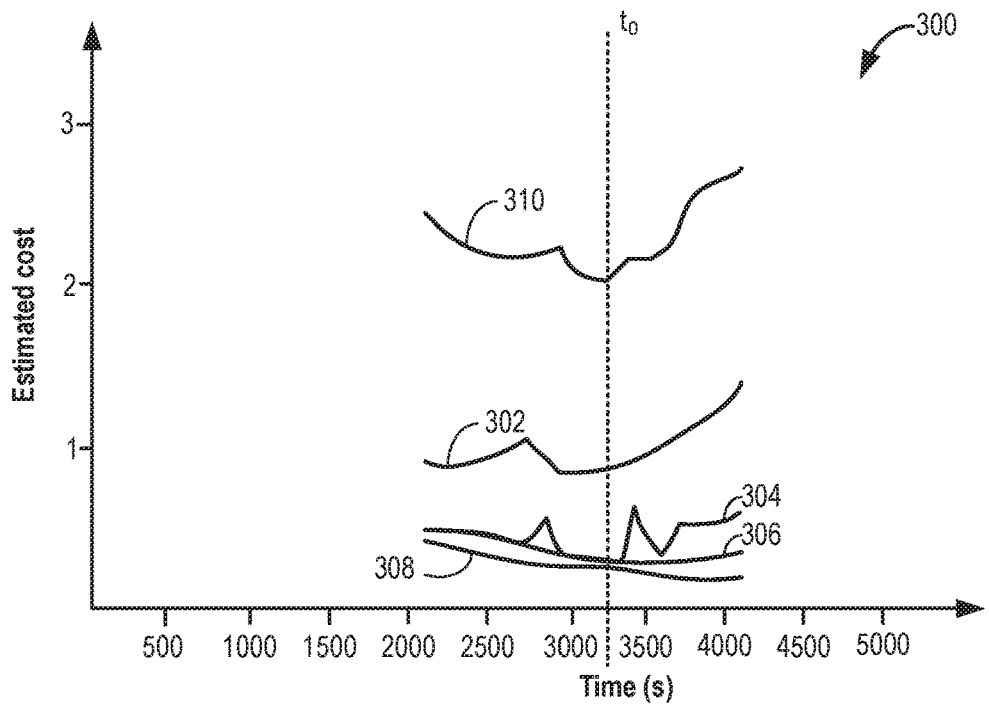
FIG. 3 shows an example graph illustrating estimated cost associated with DPF regeneration at a plurality of different times during a drive cycle.
Figure 6:
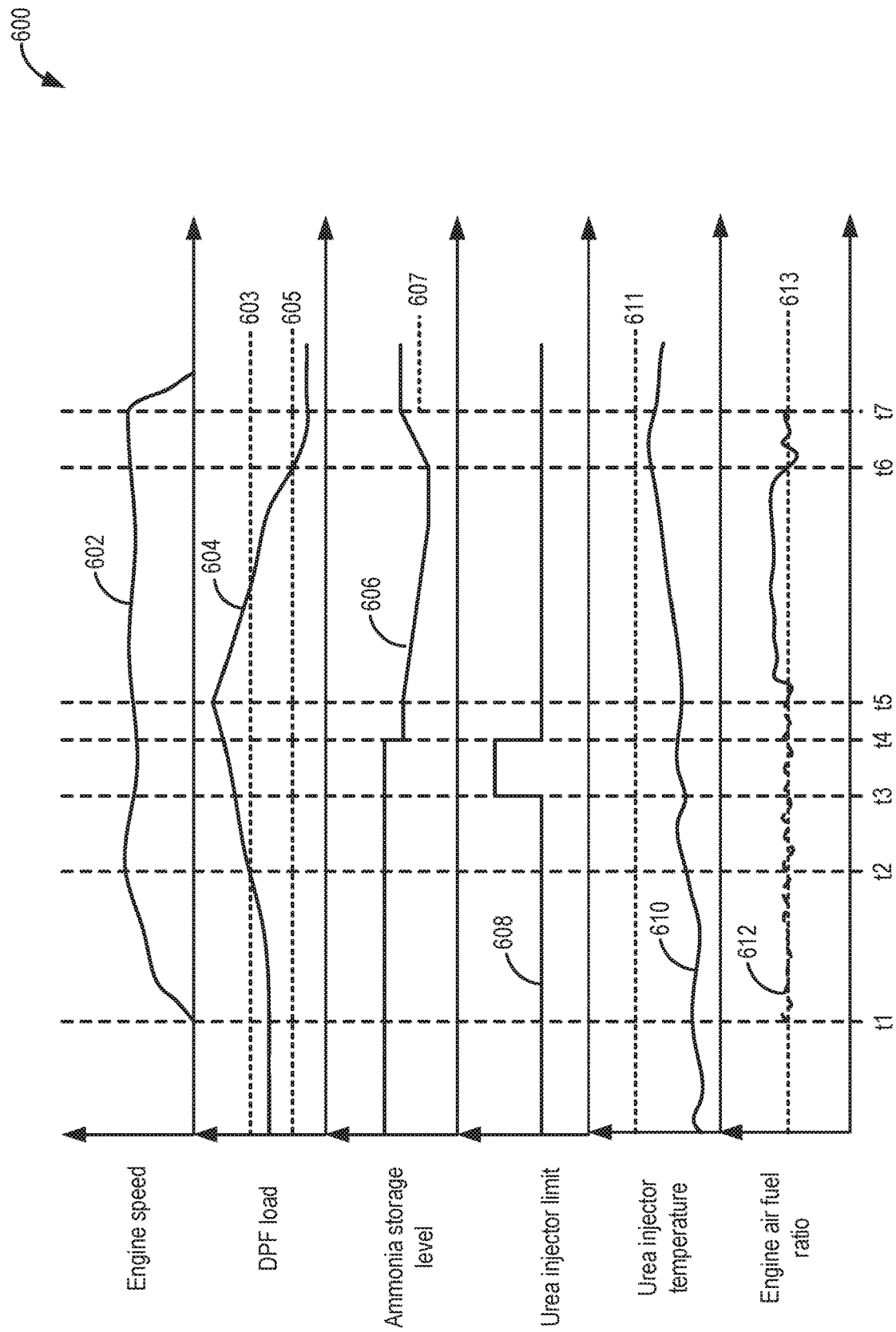
FIG. 6 shows an example regeneration of a DPF during a drive cycle.

The following description relates to systems and methods for regeneration of a particulate filter (PF) based on predicted vehicle drive conditions and catalyst ammonia storage capacity. The PF and a selective catalytic reduction (SCR) catalyst may be coupled to an exhaust passage of a diesel engine shown in FIG. 1. An engine controller may be configured to perform control routines, such as the example routines of FIGS. 2 and 3, to opportunistically regenerate the PF and adjust ammonia storage set point and urea injection limits prior to the regeneration. Graphs shown in FIGS. 2 and 3 show the fuel cost associated with carrying out the regeneration and a variation in a regeneration based on a time of initiation of the regeneration. An example regeneration of the PF during a drive cycle is shown in FIG. 6.

Figure 1:
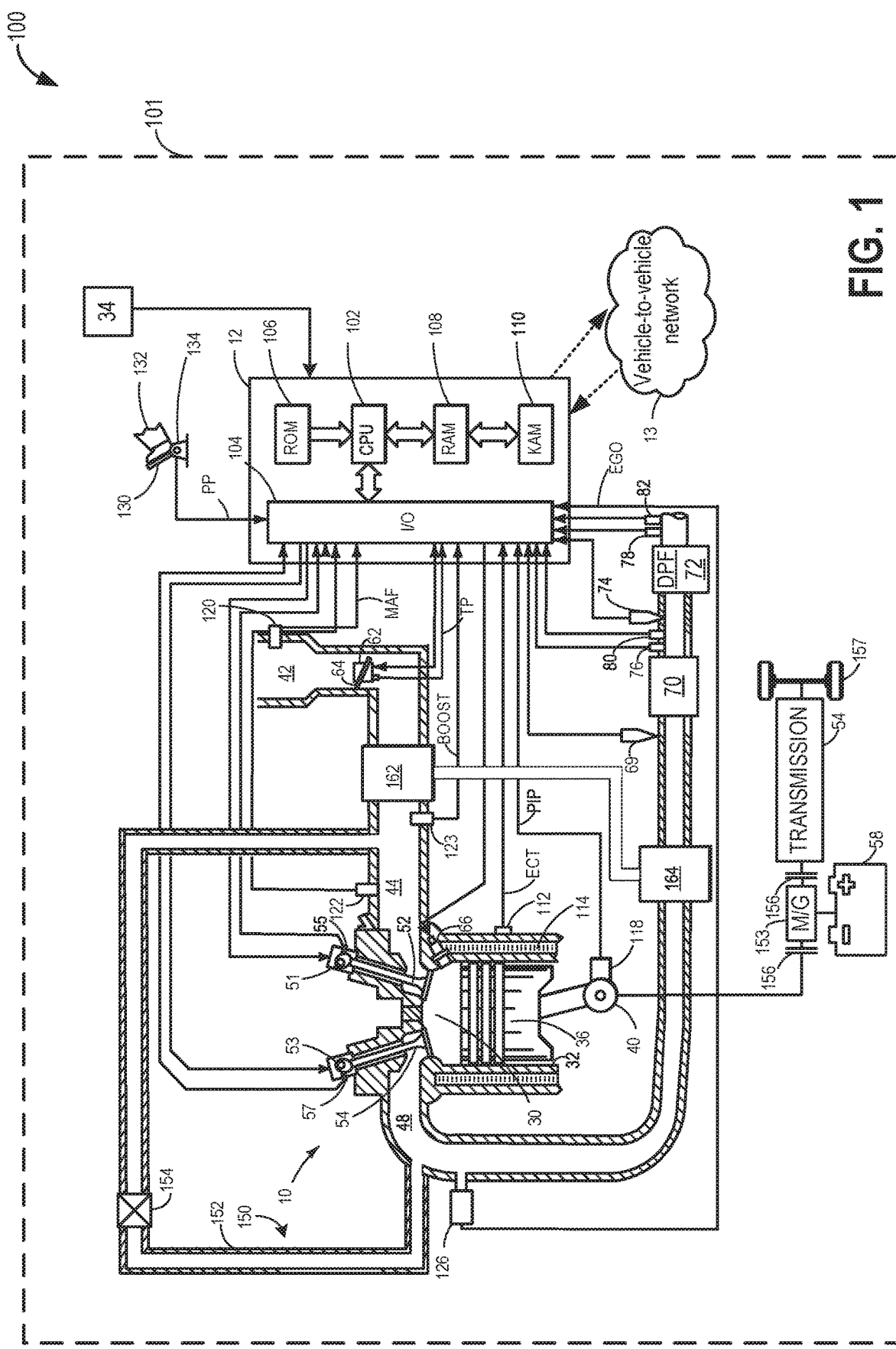
FIG. 1 shows a schematic depiction of an internal combustion engine combusting diesel fuel, and including a diesel particulate filter (DPF) and a selective catalytic reduction (SCR) catalyst.

Turning now to FIG. 1, a schematic diagram showing one cylinder of multi-cylinder internal combustion engine 10, which may be included in a propulsion system of vehicle 101, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include fixed cam timing, or may include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail, which may be a common fuel rail.

Intake manifold 44 may include a throttle 62 having a throttle plate 64. However, in other examples, the throttle may be located in intake passage 42. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air and/or EGR provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

In this embodiment the engine is a diesel engine configured to combust diesel fuel (e.g. petroleum diesel or biodiesel) via compression ignition. Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOR, HC, or CO sensor.

Emission control device 70 is shown arranged along exhaust passage 48 downstream of exhaust gas sensor 126. Device 70 may include a diesel a selective catalytic reduction (SCR) catalyst which is capable of reducing NOx in an oxygen rich environment. Reductant, such as aqueous urea, is stored in a storage vessel (not shown) and delivered through a reductant delivery system (such as injector) 69 coupled to exhaust system upstream of SCR catalyst 70. The reductant may be metered out by a pump through a control valve coupled to the delivery system 69. Doses of urea injected upstream of the SCR catalyst may be adjusted such that the reductant is completely used by the catalyst to oxidize the NOx and urea deposits do not form around the delivery system 69. Ammonia (from the injected urea) may be stored in the SCR catalyst and used during NOx reduction. Based on engine operating conditions such as exhaust temperature, NOx production rate, SCR catalyst conversion efficiency, etc. the SCR catalyst 70 may have an ammonia storage set point and storage of ammonia beyond the set point may cause ammonia slippage. The ammonia storage set point may be adjusted based on a model. In one example, ammonia storage capacity of the SCR catalyst 70 may be inversely proportional to the temperature of the catalyst. A diesel oxidation catalyst (DOC) may also be coupled to the exhaust passage 48.

At least one diesel particulate filter (DPF) 72 may be coupled downstream of the emission control device 70 in order to trap soot. The DPF may be manufactured from a variety of materials including cordierite, silicon carbide, and other high temperature oxide ceramics. As such, the DPF has a finite capacity for holding soot. Therefore, the DPF may be periodically regenerated in order to reduce the soot deposits in the filter so that flow resistance due to soot accumulation does not reduce engine performance. Filter regeneration may be accomplished by heating the filter to a temperature that will burn soot particles at a faster rate than the deposition of new soot particles, for example, 400-600° C. In one example, the DPF can be a catalyzed particulate filter containing a washcoat of precious metal, such as platinum, to lower soot combustion temperature and also to oxidize hydrocarbons and carbon monoxide to carbon dioxide and water.

A hydrocarbon (HC) reductant delivery system 74 may be used to deliver HC from the fuel tank or from a storage vessel to the exhaust system to generate heat for heating the particulate filter 72 for regeneration purposes. Alternatively, or in addition, late fuel injection (e.g., during an exhaust stroke) may be used to raise exhaust temperature.

Temperature sensors 76 and 78 may be located upstream and downstream, respectively, of DPF 72. The temperature sensors 76 and 78, or additional temperature sensors, may also be located within the DPF, or DPF temperature (or exhaust temperature) may be estimated based on operating conditions using an exhaust temperature model. A differential pressure signal may be determined from pressure sensors 80 and 82 upstream and downstream of DPF 72, respectively. A single differential pressure may also be used to measure the differential pressure across DPF 72. A single port gauge pressure sensor (SPGS) may also be used.

It should be appreciated that alternate emission control system configurations may be used in alternate embodiments. For example, emission control device 70 may be coupled downstream of the DPF. Further in other examples, a plurality of diesel particulate filters may be included in the emission control system. Each catalyst, filter, etc., may be enclosed within a single housing or alternatively may be enclosed via separate housings. It will be appreciated that numerous configurations are possible and the configuration depicted in FIG. 1 is exemplary in nature.

To regenerate the DPF, a regeneration injection strategy may be implemented. The regeneration injection strategy may implement an injection profile including a plurality of injection events such as a pilot fuel injection, a main fuel injection, a near post fuel injection, and/or a far post fuel injection. It will be appreciated that the aforementioned fuel injections may include a plurality of injection events, in other embodiments. DPF regeneration may also include injecting hydrocarbons upstream of the DPF via the injector 74. In presence of oxygen and excess fuel, the temperature upstream of a DPF may be controlled to a desired value to promote combustion of particulate matter within the DPF.

During regeneration of the DPF, due to the proximity with the DPF, temperature of the SCR catalyst 70 may also increase, thereby decreasing the ammonia storage capacity of the SCR. If the regeneration is scheduled to be terminated at an end of the drive cycle, ammonia may not be available for NOx reduction during an immediately subsequent engine start, thereby adversely affecting emissions quality. In order to maintain a desired ammonia level in the SCR catalyst at the end of a drive cycle, DPF regeneration may be terminated in response to a predicted ammonia level at the end of the drive cycle being lower than a threshold ammonia level, the threshold ammonia level based on a time to attain SCR catalyst light-off temperature during an immediately subsequent engine start. The predicted ammonia level may be predicted using an ammonia storage model, the ammonia storage model based on one or more of a NOx level at the SCR catalyst, and DPF filter regeneration conditions including the soot load and an exotherm caused by burning of hydrocarbons and oxygen at the DPF. Also, during regeneration, SCR catalyst conversion efficiency may decrease due to the increased temperature and lower availability of ammonia. Hence it may be desirable to convert NOx flowing through the SCR catalyst 70 immediately prior to the DPF regeneration. A limit of urea injection via the urea injector 69 may be increased, at a first time, to increase NOx reduction and then the limit of urea injection may be decreased, at a second time, to avert excess urea deposition after completion of the upcoming DPF regeneration. The first time may include a first duration remaining for initiation of DPF regeneration and wherein the second time may include a second duration remaining for initiation of the DPF regeneration, the first duration longer than the second duration. Also, an ammonia storage set point of the SCR may be decreased at the second time.

The limit of urea injection is, in one example, a threshold injection amount beyond which the system will not provide. Rather, the control system will clip a requested injection amount that is above the limit to the limit; but will not adjust a requested injection amount below the limit. As explained herein, the limit is adjusted with various operation conditions to provide improved feedback control.

Engine 10 may further include a compression device such as a turbocharger or a supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression (e.g., boost) provided to one or more cylinders of the engine via a turbocharger or supercharger may be varied by controller 12. Further, a sensor 123 may be disposed in intake manifold 44 for providing a BOOST signal to controller 12.

Engine 10 may further include a high pressure EGR system 150. High pressure EGR system 150 includes an EGR conduit 152 coupled to the exhaust 48 upstream of turbine 164 and coupled to the intake 44 downstream of compressor 162. High pressure EGR system 150 may include an EGR valve 154 disposed along EGR conduit 152 to control exhaust flow through EGR system 150. Engine 10 may also include a low pressure EGR system. Low pressure EGR system includes an EGR conduit coupled to the exhaust downstream of turbine and coupled to the intake upstream of compressor. Low pressure EGR system may include an EGR valve disposed along EGR conduit to control exhaust flow through EGR system.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 and send control signals to a plurality of actuators 18 coupled to engine 10. In addition to those signals previously discussed, controller 12 may receive measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122, DPF 72 soot load from pressure sensors 80 and 82, SCR 70, and DPF temperature from temperature sensors 76 and 78. Engine speed signal, RPM, may be generated by controller 12 from signal PIP. Manifold pressure signal MAP from a manifold pressure sensor may be used to provide an indication of vacuum, or pressure, in the intake manifold. The actuators may include the urea injector 69 and the hydrocarbon injector 74.

Storage medium read-only memory 106 can be programmed with computer readable data representing instructions executable by processor 102 for performing the methods and control strategies described below as well as other variants that are anticipated but not specifically listed. In one example, the controller may model ammonia storage level of the SCR catalyst 70 during regeneration of the DPF 72 based on inputs from the temperature sensor 76 and in response to a projected ammonia storage level of the SCR catalyst 70 at the end of the drive cycle reducing to below a threshold level, the controller may send a signal to the injector 74 to suspend injection of hydrocarbons to terminate the DPF regeneration.

In addition, controller 12 may receive data from the GPS 34 and/or a vehicle-to-vehicle network such as an off-board cloud network 13. At completion of a drive cycle, a database within the controller 12 may be updated with route information including driver behavioral data, engine operating conditions, date and time information, and traffic information. As described above, FIG. 1 shows only one cylinder of a multi-cylinder engine; however it should be appreciated that each cylinder may similarly include its own set of intake/exhaust valves, fuel injector, spark plug, etc.

In some examples, vehicle 101 may be a hybrid vehicle with multiple sources of torque available to one or more vehicle wheels 157. In other examples, vehicle 102 is a conventional vehicle with only an engine, or an electric vehicle with only electric machine(s). In the example shown, vehicle 101 includes engine 10 and an electric machine 153. Electric machine 153 may be a motor or a motor/generator. Crankshaft of engine 10 and electric machine 153 are connected via a transmission 46 to vehicle wheels 157 when one or more clutches 156 are engaged. In the depicted example, a first clutch 156 is provided between crankshaft and electric machine 153, and a second clutch 156 is provided between electric machine 153 and transmission 46. Controller 12 may send a signal to an actuator of each clutch 156 to engage or disengage the clutch, so as to connect or disconnect crankshaft from electric machine 153 and the components connected thereto, and/or connect or disconnect electric machine 153 from transmission 46 and the components connected thereto. Transmission 46 may be a gearbox, a planetary gear system, or another type of transmission. The powertrain may be configured in various manners including as a parallel, a series, or a series-parallel hybrid vehicle.

Electric machine 153 receives electrical power from a traction battery 58 to provide torque to vehicle wheels 157. Electric machine 153 may also be operated as a generator to provide electrical power to charge traction battery 58, for example during a braking operation.

In this way, the components of FIG. 1 enables a controller with computer readable instructions stored on non-transitory memory to: prior to a scheduled regeneration of a diesel particulate filter (DPF) coupled to an exhaust passage, adjust each of an urea injection limit for an urea injector coupled to the exhaust passage and an ammonia storage set point of a catalyst coupled to the exhaust passage, upstream or downstream of the DPF, initiate the scheduled regeneration of the DPF at a first time corresponding to a minimum weighted DPF regeneration factor, and terminate the regeneration of the DPF at a second time in response to a predicted ammonia storage level of the catalyst at an end of a current drive cycle being lower than a threshold and/or a lower than threshold soot load on the DPF.

Figure 4:
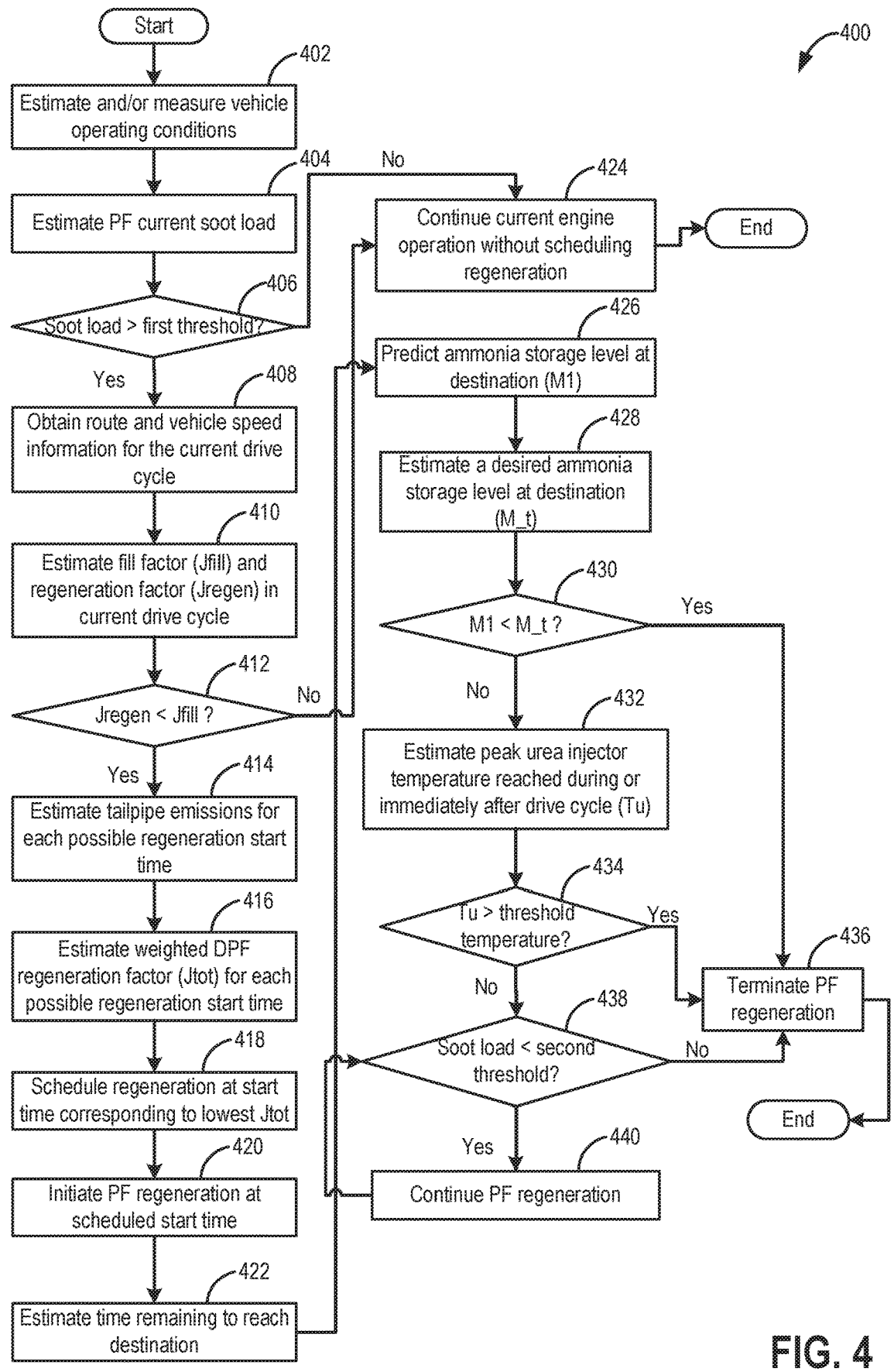
FIG. 4 shows a flowchart illustrating an example method for opportunistically regenerating a DPF.

FIG. 4 shows an example method 400 that can be implemented for opportunistically regenerating a diesel particulate filter (such as DPF 72 in FIG. 1) coupled to an engine exhaust passage. Instructions for carrying out method 400 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 402, method 400 includes estimating and/or measuring vehicle operating conditions. The estimated conditions may include, for example, engine speed (Ne), vehicle speed (Vs), engine temperature, combustion air-fuel ratio (AFR), exhaust catalytic reduction (SCR) catalyst (such as SCR catalyst 70 in FIG. 1) temperature, SCR catalyst ammonia storage level, urea injector dosage limit, ambient conditions, pressure drop across the DPF filter, pedal position, etc.

At 404, a current soot load, e.g., the amount of stored particulate in the DPF may be estimated. The current soot load may be estimated by a variety of approaches. In one example, the level of soot accumulated in on the DPF may be estimated based on inputs from one or more exhaust pressure sensors (such as pressure sensors 80 and 82 in FIG. 1) and soot sensors positioned upstream and/or downstream of the DPF. In another example, the soot load may be estimated as a function of the current stored particulate amount and the incremental amount of particulates generated per predetermined sampling time during the combustion process. In this example, the incremental amount of particulates generated per predetermined sampling time may be based on engine operating conditions such as fuel injection amount and engine speed.

In yet another example, if regeneration is in progress, the soot load may be determined by including the particulates generated by the combustion process, the current stored particulate amount, and the amount of particulates released during the regeneration stage; wherein, the amount of particulates generated during the combustion process may be determined based on engine operating conditions such as fuel injection amount and engine speed; and wherein, the amount of released particulates during the regeneration process may be determined based on exhaust gas space velocity and particulate filter temperature.

Upon determining the current soot load, method 400 may proceed to 406. At 406, method may include determining if the current soot load is greater than a first threshold amount. As the soot level in the PF increases, the exhaust back pressure may increase pumping losses, thereby affecting engine performance and increasing fuel consumption. The first threshold soot load may be calibrated based on fuel consumption proportional to the pumping losses.

If it is determined that the soot load is lower than the first threshold, current engine operation may be continued without scheduling a DPF regneration. Current engine operation may include operating the engine at a schiochiometric air fuel ratio. Also, hydrocarbons (such as fuel) may not be delivered upstream of the DPF.

However, if it is determined that the soot load is higher than the first threshold, the controller may schedule a regeneration of the DPF during the drive cycle. In order to optimally schedule the regeneration, at 408, route and vehicle speed information may be obtained for the current drive cycle based on a predicted behavior of a vehicle operator, the behavior determined based on a current vehicle speed, an average speed of a lead vehicle network including one or more vehicles travelling ahead of the vehicle and communicating with the cloud network, a current location of the vehicle, a final destination of the vehicle, and a travel history which includes a driving history of the vehicle and a driving history of the vehicle operator.

In one example, if a destination has been specified by the driver such as via an input to the on-board navigation system, one or more routes between the origin and the destination may be retrieved from an onboard database or obtained from a network cloud via a wireless connection. The origin (such as coordinates, geographical location) may be determined from the on-board navigation system or from the network cloud. The database is maintained updated with information of frequently travelled vehicle routes. Information including origin and destination, routes taken, stops during trip and duration of each stop, traffic information for each route, day and time of travel, engine operating conditions, fuel consumption, duration of travel, possible degree of PF regeneration, driver driving characteristics, etc. may be available in the database.

In another example, if destination has not been specified by the driver, a possible destination may be predicted based on driver history as stored in the database. As an example, the prediction may be carried out while taking into account the current vehicle location, frequently travelled routes during the particular time of the day and the day of the week, and a driver state of mind. Traffic conditions (such as traffic congestion) and weather conditions (such as rain or snow forecast) in the neighborhood of the current vehicle location may also be taken into account while predicting the destination. Traffic conditions may be obtained from the network cloud or via the vehicle-to-vehicle network. For example, traffic information may include the average vehicle network speed, the average vehicle network speed relative to the vehicle speed, the average load, and the average exhaust temperature of the vehicle network.

Based on the predicted route and the traffic information, a vehicle speed profile during the course of the drive cycle may be estimated. Based on the route (distance to destination) and the speed of travel, a time to reach the destination (also end of drive cycle, $t_{end}$) may also be estimated. Hence, DPF regeneration may be schedule between the current time (t) and the end of drive cycle ($t_{end}$).

At 410, a DPF fill factor ($J_{fill}$) including a fuel consumption cost associated with filling the DPF (without regeneration) during the remaining course of the drive cycle may be estimated and a regeneration factor ($J_{regen}$) including a cost to regenerate the DPF starting at a certain point in the drive cycle may be estimated.

The DPF fill factor may be an estimated (projected) cost to fill the DPF. Filling the DPF may increase exhaust back pressure, thereby reducing efficient engine operation due to higher pumping loses, and the cost to fill may be directly proportional to the pumping losses which in turn may be directly proportional to fuel consumption to overcome the pumping losses. DPF fill factor may be based on an increased probability of having to undergo forced and critically necessary regeneration due to incremental soot load approaching a higher threshold (e.g., a threshold higher than the first threshold). The forced regenerations may have a high probability of inefficient operation; hence the projected cost to fill may increase as the soot load increases above the first threshold. Further, at the current soot load, and an estimated soot accumulation rate (the accumulation rate based on current vehicle operating conditions and/or navigation information including destination information), an estimation of a remaining horizon (e.g., remaining drive distance, remaining duration etc.) before a forced regeneration may become necessary may be determined. For example, a predicted duration less than a threshold predicted duration may increase the projected cost to fill. That is, as the predicted duration decreases, the cost of filling may increase. Still further, filling the DPF may also increase a regeneration burden for a next regeneration event, thereby increasing the probability of a partial regeneration due to longer regeneration duration required for higher soot loads. In other words, as the soot load increases, longer regeneration durations may be required. Therefore, a probability of partial regeneration may increase, and consequently, the projected cost of filling may increase.

The regeneration factor may be an estimated (projected) cost of regeneration and may include fuel consumption costs during the DPF regeneration such as due to fuel injected upstream of the DPF. In the presence of oxygen, the fuel injected upstream of the DPF may burn at the face of the DPF thereby producing thermal energy for burning the soot deposited on the DPF. The longer the regeneration, the higher may be the projected cost to regenerate. Also, projected cost of regeneration at a given soot load less than the first threshold when insufficient soot load is present may be greater than the projected cost of regeneration at a given soot load greater than the first threshold since the exotherm once generated may not be completely utilized for lower soot loads.

Further, projected cost of regeneration may be based on a fuel cost to light-off a diesel oxidation catalyst (DOC) and/or the SCR before a regeneration temperature can be generated over the SCR temperature. Therefore, the projected cost of regeneration may be based on the DOC and/or SCR temperature. For example, during cold start operations, additional fuel may be required to light-off the DOC and/or SCR catalyst before a regeneration temperature is established. Therefore, an amount of fuel required to increase the exhaust temperature to the regeneration temperature may be higher during cold start operation than during vehicle operation when the DOC and SCR has attained the light-off temperature. Consequently, the cost of regeneration during cold catalyst conditions (e.g., during cold starts) may be greater than the cost of regeneration during conditions after DOC and SCR light-off is achieved as less fuel may be required to attain the regeneration temperature after the DOC and SCR light-off.

FIG. 2 shows an example graph 200 illustrating estimated cost associated with DPF regeneration and DPF filling during a drive cycle. Line 202 shows an estimated cost to fill the DPF (DPF fill factor) over the course of the drive cycle while line 204 shows an estimated cost to regenerate the DPF (DPF regeneration factor) during a time period in the drive cycle. The x-axis shows time.

Prior to time $t_0$, the cost to fill is lower than the cost to regenerate, hence it is not desirable to schedule and execute a DPF regeneration during this time period. At time to, the cost to fill increases over the cost to regenerate. Hence, it is beneficial to schedule a DPF regeneration after time $t_0$. Even though the cost to fill increases continually, after time t1, the cost to regenerate is higher than the cost to fill. The increase in the cost to regenerate may be due to road conditions and/or traffic conditions such as frequent idle stops and light load operation (urban driving conditions) during which regeneration may not be sustained. Hence, the regeneration may be optimally scheduled between time $t_0$ and $t_1$ (regeneration window). The regeneration window is within the predicted time to reach the destination and the regeneration window includes a duration of time during which an estimated regeneration factor is lower than an estimated DPF fill factor.

The regeneration may be initiated at a particular time (possible regeneration start time) and completed within the regeneration window. Based on the previously obtained route and vehicle speed information, a plurality of possible regeneration start times may be identified at which DPF regeneration may be initiated.

In this way, the DPF fill factor may be estimated based on each of an estimated fuel consumption corresponding to a change in exhaust back pressure with increase in soot load, a probability of forced regeneration, and a probability of partial regeneration, and the regeneration factor may be estimated based on a fuel consumption to initiate DPF regeneration.

Returning to FIG. 4, at 412, the routine includes determining if the regeneration factor ($J_{regen}$) is lower than the fill factor ($J_{fill}$). If it is determined that the projected cost to regenerate is higher than the projected cost to fill, the routine may proceed to 424 and current engine operation may be continued and the DPF may be continued to be filled without scheduling DPF regeneration.

If it is determined that the projected cost to regenerate is lower than the projected cost to fill, at 414, tailpipe emissions during DPF regeneration starting at each of the possible regeneration start times may be estimated. Due to the exotherm created during the regeneration, temperature of the SCR may increase during the DPF regeneration causing ammonia storage level of the SCR to decrease. Due to the decrease in ammonia storage level at the higher temperature, catalyst conversion efficiency of the SCR catalyst decreases, thereby increasing the possibility of tailpipe NOx emissions. NOx production may be based on engine operating parameters which may vary over the course of the regeneration window. Hence, a level of NOx emissions corresponding to each possible regeneration start time may be predicted as a function of NOx production rate and catalyst conversion efficiency during DPF regeneration initiated at a particular start time. A cost factor associated with the NOx emissions for each regeneration start time may be estimated ($J_{NOx}$) as a function of the predicted NOx emissions level during DPF regeneration.

Due to the decreased ammonia storage level during DPF regeneration, there may be a possibility of ammonia slip (release of ammonia from storage at the SCR catalyst) during the DPF regeneration especially at the onset of the regeneration. A level of ammonia slippage may be predicted as a function of an amount of ammonia stored in the SCR catalyst prior to initiation of the regeneration, catalyst conversion efficiency during the regeneration, and the change in the ammonia storage level during the regeneration corresponding to each possible regeneration start times. A cost function associated with the level of ammonia slippage for each possible regeneration start time may be estimated ($J_{NH3}$) as a function of the predicted ammonia slippage during DPF regeneration.

At 416, a weighted DPF regeneration factor may be estimated for each possible regeneration start time using equation 1:

$$J_{tot(t+\tau)} = J_{regen} + J_s + J_{NOx} + J_{NH_3} \qquad (1)$$

wherein $J_{tot\ (t+\tau)}$ is the weighted DPF regeneration factor (also referred herein as the total cost) associated with regenerating the DPF starting at time t+τ, τ from 1 to n over the duration of the regeneration window. $J_{regen}$ is the regeneration factor (projected cost) associated with carrying out the regeneration as described in step 410. $J_s$ is the cost function associated with the soot load remaining on the DPF at the end of the drive cycle. In one example, $J_s$ may be directly proportional to the soot load remaining on the DPF at the end of the drive cycle. If the regeneration is not completed, a higher amount of soot load may remain on the DPF, thereby increasing the fuel consumption (due to increased exhaust back pressure) during an immediately subsequent engine operation. Further, weightage of $J_s$ in equation 1 may be adjusted based on driver history and driving conditions. In one example, if based on driver history, it is observed that rate of completion of DPF regeneration is below a threshold percentage (such as 40%) during prior drive cycles, a higher cost may be associated to the remaining soot load. $J_{NOx}$ is the cost function associated with NOx emissions level (as described in step 414) during the regeneration and $J_{NH_3}$ is the cost function associated with ammonia slippage (as described in step 414) during the regeneration.

FIG. 3 shows an example graph 300 illustrating the estimated weighted DPF regeneration factor associated with DPF regeneration starting at a possible regeneration start time within a regeneration window. Line 302 shows variation in $J_s$, cost function associated with the soot load remaining on the DPF at the end of the drive cycle, upon regeneration start at each possible start time. Line 304 shows variation in $J_{regen}$, the cost associated with carrying out the regeneration, upon regeneration start at each possible start time. Line 306 shows variation in $J_{NOx}$, the cost function associated with NOx emissions, upon regeneration start at each possible start time. Line 308 shows variation in $J_{NH_3}$, the cost function associated with ammonia slippage, upon regeneration start at each possible start time. Line 310 shows the total cost, $J_{tot\ (t+\tau)}$, associated with regenerating the DPF at time t+τ. As seen from line 310, the total cost of regeneration is lowest if the regeneration is initiated at time $t_0$. The regeneration start time (t0) may be estimated using equation 2:

$$t_0 = t + \mathrm{argmin}(J_{tot(t+\tau)}) \qquad (2)$$

where $t_0$ is the initiation time for DPF regeneration, t is the current time, and argmin $J_{tot\ (t+\tau)}$) is the minimum of the total cost $J_{tot\ (t+\tau)}$ of regeneration.

In this way, the weighted DPF regeneration factor is estimated as a function of each of an estimated fuel consumption to initiate and sustain the regeneration, an estimated fuel consumption due to soot load remaining on the DPF upon reaching the destination, an estimated level of NOx emissions during the regeneration, and an estimated level of NH3 emissions during the regeneration.

Returning to FIG. 2, 1t 418, DPF regeneration may be scheduled to start at time to corresponding to the lowest $J_{tot}$. At 420, PF regeneration may be initiated at the scheduled time. In order to initiate regeneration, the engine may be operated at a leaner than stoichiometric air fuel ratio such that a higher amount of oxygen may be available at the DPF for burning the soot. To increase DFP temperature, hydrocarbons from the fuel tank may be delivered to the exhaust passage upstream of the DPF immediately prior to the regeneration. In the presence of oxygen, the hydrocarbon may exothermally burn at the face of the DPF, thereby increasing DPF temperature. The increased temperature causes the soot deposited on the DPF to burn, thereby decreasing the DPF soot load.

At 422, based on route information and vehicle speed, the controller may estimate the time remaining to reach the destination. At 426, the controller may predict a level of stored ammonia (such as a quantity of store ammonia, M1) in the SCR catalyst at destination. As discussed earlier, during the ongoing DPF regeneration, due to the increased DPF temperature, there may be a decrease in the ammonia storage level. The ammonia storage level may be inversely proportional to the DPF temperature. The controller may predict DPF temperature and SCR catalyst temperature over the course of the regeneration and after the regeneration based on a soot burn model. The soot burn model may be based on the DPF soot load at the initiation of the regeneration and the exotherm caused by burning of hydrocarbons and oxygen at the DPF. The controller may then use a model to predict the level of stored ammonia, at the end of the drive cycle, as a function of temperature variation in the SCR catalyst up to the end of the drive cycle. In one example, the DPF regeneration may continue until the end of the drive cycle causing a lower level of stored ammonia at the end of the drive cycle.

At 428, a desired ammonia storage level(M_t) may be estimated at destination (end of drive cycle. M_t may be based on a desired ammonia level stored in the SCR catalyst during an immediately subsequent engine start. The amount of ammonia available for treating the NOx at the engine start may be directly proportional to M_t. During the immediately subsequent engine start, after SCR catalyst light off, the stored ammonia may be used to reduce the NOx flowing through the SCR catalyst. If the time to light-off is shorter, there may not be sufficient time for urea injection and conversion of urea to ammonia prior to light off and if stored ammonia is not available, conversion efficiency of the SCR catalyst may be adversely affected. The controller may estimate M_t as a function of a time to SCR catalyst light-off during the immediately subsequent engine start. The time to light-off may be estimated based on a predicted time, location of the immediately subsequent engine start, and ambient conditions at the location. The location of the immediately subsequent engine start may be the destination of the current drive cycle. The time of the immediately subsequent engine start may be predicted based on driver history. In one example, when parked at a given location, the driver may start the vehicle at a particular time each weekday. Weather conditions (such as ambient temperature) at the location of the vehicle may be obtained from the network cloud.

At 430, the routine includes determining if the ammonia storage level of SCR at destination (M1) is lower than the desired ammonia storage level (M_t). If M1 is lower than M_t, during the immediately subsequent engine start, sufficient ammonia may not be present in the SCR catalyst to treat NOx, hence negatively affecting emissions quality. If it is determined that M1 is lower than M_t, at 436, PF regeneration may be terminated. By terminating DPF regeneration prior to the end of the drive cycle, the ammonia storage level may increase after the termination and urea may be injected to store ammonia in the SCR catalyst for use during the immediately subsequent engine start. In one example, the termination of the DPF regeneration may be scheduled such that by injecting urea prior to the end of the drive cycle (and after termination of the DPF) M1 may increase to above M_t. In this way, exhaust quality during an immediately subsequent engine start may be taken into account while scheduling a DPF regeneration If it is determined that M1 is higher than M_t, at 432, the controller may estimate (such as using a model) a peak urea injector temperature (Tu) reached during or immediately after completion of the drive cycle. Due to the isotherm at the DPF, the urea injector temperature may increase. If the DPF regeneration continues until the end of the drive cycle or close to the end of the drive cycle, the injector temperature may continue to increase (in absence of ambient air flow) after engine shut down, and the peak urea injector temperature may occur after the end of the drive cycle. The controller may model the peak urea injector temperature based on a current urea injector temperature, a temperature profile of the DPF during the regeneration, and an ambient temperature of the destination (vehicle location at the end of the drive cycle).

At 434, the routine includes determining if peak urea injector temperature (Tu) is higher than a threshold temperature. The threshold temperature may be calibrated based on the melting point of the material of the injector. At temperatures higher than the threshold temperature, there may be structural degradation (such as deformation caused by melting) of the urea injector. Therefore, if it is determined that Tu is higher than the threshold temperature, the routine may proceed to 436 to terminate the regeneration.

If it is determined that Tu is lower than the threshold temperature, at 438, the routine includes determining if the remaining soot load on the DPF (during the regeneration) is lower than a second threshold load. Below the second threshold soot load, the soot deposited on the DPF may not affect exhaust back pressure and pumping losses. The second threshold load may be lower than the first threshold load. If it is determined that the soot load on the DPF is higher than the second threshold soot load, at 440, regeneration may be continued. Continuing regeneration may include injecting hydrocarbons upstream of the DPF and operating the engine with a leaner than stoichiometric air fuel ratio. If it is determined that the soot load on the DPF is lower than the second threshold load, at 436, DPF regeneration may be terminated. The controller may send a signal to the actuator coupled to the hydrocarbon injector to suspend injection of hydrocarbons to the exhaust passage and the air fuel ratio may be adjusted based on current engine operating conditions.

In this way, in response to a higher than first threshold soot load on a diesel particulate filter (DPF) coupled to an engine exhaust passage, each of a route, a vehicle speed profile, and a time remaining in a current drive cycle may be estimated based on information received from one or more external sources; initiation of DPF regeneration at a first future time may be scheduled, during the current drive cycle, based on a weighted combination factor of fuel usage and emissions level during the regeneration; and DPF regeneration may be terminated based on one or more of DPF soot load, ammonia storage level at an exhaust catalyst, and a temperature of an exhaust urea injector.

Figure 5:
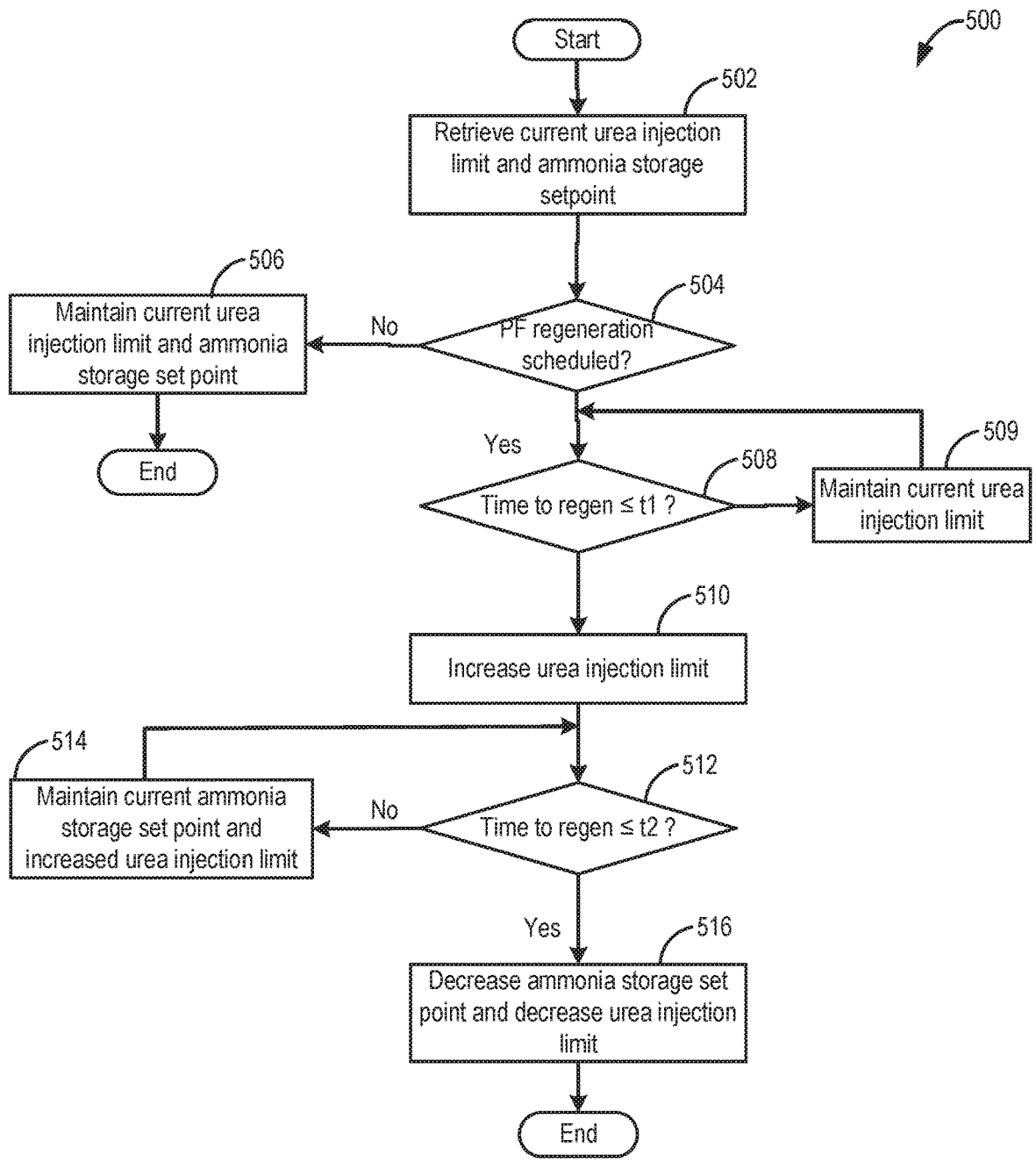
FIG. 5 shows a flowchart illustrating an example method for adjusting each of a urea injection limit and an ammonia storage set point prior to the DPF regeneration.

FIG. 5 shows a flowchart 500 illustrating an example method for adjusting each of a urea injection limit and an ammonia storage set point prior to regeneration of a diesel particulate filter. At 502, a current urea injection limit and an ammonia storage set point may be retrieved. Urea injection limit may correspond to a maximum dosage of urea that may be injected upstream of a selective catalytic reduction (SCR) catalyst. If dosage is increased beyond the limit, the reductant may not be completely used up by the SCR catalyst and urea/ammonia deposits may form around the injector causing hardware degradation. The urea injection limit may be based on an amount of reductant desired by the SCR catalyst for effective treatment of NOx flowing through the SCR catalyst. The NOx produced during combustion may be based on engine operating conditions including engine load, engine temperature, and engine speed. The controller may set the urea injection limit using a look up table with each of the engine load, the engine temperature, and the engine speed as input and the urea injection limit (in grams/second) as the output.

The ammonia storage set point corresponds to an amount of ammonia that may be stored in the SCR catalyst or an ammonia level in the SCR catalyst. The stored ammonia may be used for reduction of NOx at the SCR catalyst. If the amount of ammonia at the SCR catalyst is higher than the set point, ammonia may slip through the tailpipe. The amount of ammonia that may be stored in the SCR catalyst may be based on catalyst temperature. The controller may set the ammonia storage set point using a look up table with the catalyst temperature as an input and the ammonia storage set point as the output.

At 504, the routine includes determining if a DPF regeneration has been scheduled during the drive cycle. If it is determined that DPF regeneration has not been scheduled, at 506, the current urea injection limit and the ammonia storage set point may be maintained. At 508, the routine includes determining if the time remaining to the initiation of the DPF regeneration is lower than (or equal to) a first threshold time (t1). The first threshold time may be calibrated based on an anticipated ammonia deposit growth rate upon urea injection. In one example, t1 may be 30 mins prior to initiation of the regeneration. If it is determined that the time to initiate DPF regeneration is higher than the first threshold time t1, at 409, the current urea injection limit may be maintained.

If it is determined that the time to initiate DPF regeneration is lower than the first threshold time t1, at 510, the urea injection limit may be increased as a function of time. Due to the increased urea injection limit, a higher amount of reducing agent may be available for treating the NOx in the SCR catalyst prior to the initiation of the regeneration. In one example, the updated urea injector limit may be given by equation 3:

$$m_{Lim} = m_{Lim\_o} * f(t1) \quad (3)$$

where $m_{Lim}$ is the time variant updated urea injection limit, $m_{Lim\_o}$ is the current urea injection limit, and $f(t1)$ is a function of time. In one example, $f(t1)$ is a non-zero positive constant. The increased deposit limit may improve modeling of the ammonia storage level (as estimated in step 426 in FIG. 4) during the DPF regeneration and therefore improve NOx conversion upon an immediately subsequent engine start.

At 512, the routine includes determining if the time remaining to the initiation of the DPF regeneration is lower than (or equal to) a second threshold time (t2). The second threshold time may be calibrated based on the amount of ammonia level in the SCR catalyst. In one example, t2 may be 5 mins prior to initiation of the regeneration. If it is determined that the time remaining to the initiation of the DPF regeneration is higher than t2, at 514, the current ammonia storage set point and the updated urea injection limit may be maintained.

If it is determined that that the time remaining to the initiation of the DPF regeneration is lower than (or equal to) t2, at 516, the ammonia storage set point may be decreased to a nominal value and also the urea injection limit may be decreased to the previous urea injection limit. By reducing ammonia storage level, the remaining ammonia in the SCR may be used up prior to the regeneration. During the regeneration, due to the increased SCR temperature, there may be a decrease in ammonia storage capacity of the catalyst and by preemptively reducing the ammonia storage set point, slip of excess ammonia through the tailpipe may be averted. In one example, the updated ammonia storage set point may be given by equation 4:

$$m_{NH3} = m_{NH3\_o} * f(t2) \quad (4)$$

where $m_{NH3}$ is the updated ammonia storage set point, $m_{NH3\_o}$ is the current ammonia storage set point, and $f(t2)$ is a function of time. In one example, $f(t2)$ is a non-zero positive constant.

In this way, the urea injection limit may be increased while maintaining a current ammonia storage set point at a first time until initiation of the scheduled regeneration, and then each of the urea injection limit and the ammonia storage set point may be decreased at a second time until initiation of the scheduled regeneration, the first time until initiation of the scheduled regeneration is longer than the second time until initiation of the scheduled regeneration.

FIG. 6 shows an example timeline 600 illustrating regeneration of a diesel particulate filter (such as DPF 72 in FIG. 1) during a drive cycle. The horizontal (x-axis) denotes time and the vertical markers t1-t7 identify significant times in the routine for engine oil and engine heating.

The first plot, line 602, shows variation in engine speed as estimated via a crankshaft position sensor. The second plot, line 604, shows a soot load accumulated on the DPF as estimated via pressure sensors coupled to the exhaust passage upstream and downstream of the DPF. Dashed line 603 denotes a first threshold DPF load above which DPF regeneration may be desired while dashed line 505 denotes a second threshold DPF load below which DPF regeneration may be terminated. Each of the first threshold and the second threshold may be calibrated based on fuel penalty caused by exhaust back pressure generated by DPF load. The third plot, line 606, shows a modeled ammonia storage level (such as an ammonia storage set point) of an exhaust selective catalytic reduction (SCR) catalyst. Dashed line 607 shows a threshold ammonia storage level at the end of the drive cycle. If a predicted ammonia level at the end of the drive cycle is lower than the threshold ammonia storage level, the DPF regeneration is to be terminated prior to the end of the drive cycle to conserve the remaining ammonia in the SCR catalyst. The threshold ammonia storage level may be calibrated based on predicted details of an immediately subsequent engine start including time, location, weather at the location, etc. The fourth plot, line 608, shows an injection limit of a urea injector coupled to the exhaust passage upstream of the SCR catalyst. The fifth plot, line 610, shows a variation of urea injector temperature as modeled based on exhaust temperature. Dashed line 611 shows a threshold temperature above which there may be degradation of the urea injector hardware. The sixth plot, line 612, shows an engine air fuel ratio. Dashed line 613 denotes a stoichiometric air fuel ratio.

Prior to time t1, the engine is at rest and fuel is not delivered for combustion. There is no change in the DPF soot load, ammonia storage level, and urea injector limit. The urea injector temperature remains below the threshold temperature 611. At time t1, the engine is started and between time t1 and t2, an increase in DPF soot load is observed as soot (product of combustion) from the exhaust accumulates on the DPF.

At time t2, in response to the soot load on the DPF increasing to the first threshold load 603, a DPF regeneration is scheduled. Based on current driving conditions and upcoming route and traffic conditions, it is determined that it would be cost effective to initiate the DPF regeneration at time t5 during the current drive cycle. Between time t2 and t5, the soot continues to accumulate on the DPF.

In order to catalytically treat any NOx present in the SCR catalyst prior to the DPF regeneration, at time t3, a dosage limit of the urea injector is increased to increase an amount of reductant available at the SCR catalyst. In the presence of the reductant, between time t3 and t4, NOx adsorbed in the SCR catalyst is reduced and the resulting nitrogen and water is routed to the atmosphere via the tailpipe. At time t4, the dosage limit of the urea injector is decreased and also an ammonia storage set point is decreased. Due to the decreased storage set point, any unused reductant can no longer be stored in the SCR catalyst. By reducing the urea injector dosage limit, between time t4 and t5, the amount of reductant available is decreased and the entire amount of available reductant is utilized in NOx treatment.

At time t5, the air fuel ratio is enleaned relative to stoichiometry to initiate DPF regeneration. Hydrocarbon is injected upstream of the DPF to produce the heat (upon combustion with oxygen in the exhaust gas) at the face of the DPF desired for exothermally burning the soot on the DPF.

Between time t5 and t6, DPF regeneration is continued and the soot level decreases. Due to the increased exhaust temperature, temperature of the SCR catalyst increases, thereby decreasing the catalyst's ammonia storage capacity. However, since prior to the regeneration, the ammonia storage level had been preemptively reduced and the remaining ammonia has been used up for NOx treatment, slippage of excess ammonia (from the SCR catalyst) during DPF regeneration is averted. During the regeneration, it is predicted that the ammonia storage level at the end of the drive cycle (at time t7) will remain above the threshold 607. Also, due to the exothermal regeneration process, temperature of the urea injector increases between time t5 and t6 (remains within threshold 611).

At time t6, in response to the DPF load reducing to below the second threshold 605, regeneration is terminated and a stoichiometric engine air fuel ratio is resumed. Also, after time t6, due to the completion of the DPF regeneration, SCR temperature and urea injector temperature decreases. Due to the decrease in SCR temperature, the ammonia storage set point increases. At time t7, the drive cycle ends and the engine speed decreases to zero. The ammonia level continues to be above the threshold 607 ensuring availability of ammonia for catalytic reduction at the start of an immediately subsequent drive cycle.

In this way, by preemptively adjusting urea dosage and ammonia storage level in the SCR catalyst prior to initiation of the DPF regeneration, NOx reduction prior to the DPF regeneration may be increased and possibility of ammonia slippage during the regeneration may be reduced. By scheduling DPF regeneration at a time corresponding to a lowest cost, fuel efficiency and emissions quality may be improved. The technical effect of predicting an ammonia storage capacity at completion of a drive cycle during DPF regeneration is that the regeneration may be opportunistically terminated to maintain at least a desired amount of ammonia in the SCR catalyst to be used during an immediately subsequent engine start. Overall, by scheduling the DPF regeneration based on a predicted drive cycle, ammonia storage level, and PF temperature, engine efficiency, system robustness, and emissions quality may be improved.

An example method comprises: selectively regenerating a diesel particulate filter (DPF) coupled to an exhaust passage based on a soot load, a predicted time to reach a destination, and a predicted ammonia level at a selective catalytic reduction (SCR) catalyst at the predicted time of reaching the destination. In any preceding example, additionally or optionally, selectively regenerating the DPF includes, in response to the soot load being higher than a first threshold soot load, scheduling the regeneration of the particulate filter within a regeneration window. In any or all of the preceding examples, additionally or optionally, the regeneration window is within the predicted time to reach the destination, the regeneration window including a duration of time during which an estimated regeneration factor is lower than an estimated DPF fill factor. In any or all of the preceding examples, additionally or optionally, the estimated DPF fill factor is estimated based on each of an estimated fuel consumption corresponding to a change in exhaust back pressure with increase in soot load, a probability of forced regeneration, and a probability of partial regeneration. In any or all of the preceding examples, additionally or optionally, the estimated regeneration factor is estimated based on a fuel consumption to initiate DPF regeneration. In any or all of the preceding examples, the method further comprises, additionally or optionally, estimating a level of NOx emissions during DPF regeneration starting at a possible regeneration start time, and a level of $NH_3$ emissions during DPF regeneration starting at the possible regeneration start time, wherein the possible regeneration start time is one of a plurality of possible regeneration start times within the regeneration window. In any or all of the preceding examples, the method further comprises, additionally or optionally, estimating a weighted DPF regeneration factor corresponding to the possible regeneration start time and initiating DPF regeneration at a start time corresponding to a lowest estimated weighted DPF regeneration factor, the weighted DPF regeneration factor based on each of an estimated fuel usage due to soot load remaining on the DPF upon reaching the destination, the estimated regeneration factor, the estimated level of NOx emissions, and the estimated level of $NH_3$ emissions. In any or all of the preceding examples, additionally or optionally, the predicted ammonia level is predicted using an ammonia storage model, the ammonia storage model based on DPF filter regeneration conditions including the soot load and an exotherm caused by burning of hydrocarbons and oxygen at the DPF. In any or all of the preceding examples, additionally or optionally, selectively regenerating based on the predicted ammonia level includes terminating DPF regeneration in response to the predicted ammonia level being lower than a threshold ammonia level, the threshold ammonia level based on a time to attain SCR catalyst light-off temperature during an immediately subsequent engine start. In any or all of the preceding examples, additionally or optionally, selectively regenerating includes terminating DPF regeneration in response to temperature of a urea injector upstream of the SCR catalyst being higher than a threshold temperature, the SCR catalyst coupled to the exhaust passage upstream or downstream of the DPF. In any or all of the preceding examples, the method further comprises, additionally or optionally, increasing a limit of urea injection via the urea injector at a first time and then decreasing the limit of urea injection at a second time, wherein the first time includes a first duration remaining for initiation of DPF regeneration and wherein the second time includes a second duration remaining for initiation of the DPF regeneration, the first duration longer than the second duration. In any or all of the preceding examples, the method further comprises, additionally or optionally, decreasing an ammonia storage set point of the SCR at the second time. In any or all of the preceding examples, additionally or optionally, the predicted time to reach the destination is estimated based on vehicle operating conditions including vehicle speed, travel history of an operator, and a route information received from an external network cloud via a navigation system.

Another example method for a vehicle comprises: in response to a higher than first threshold soot load on a diesel particulate filter (DPF) coupled to an engine exhaust passage, predicting each of a route, a vehicle speed profile, and a time remaining in a current drive cycle based on information received from one or more external sources, scheduling initiation of DPF regeneration at a first future time, during the current drive cycle, based on a weighted combination factor of fuel usage and emissions level during the regeneration, and terminating DPF regeneration based on one or more of DPF soot load, ammonia storage level at an exhaust catalyst, and modeled a temperature of an exhaust urea injector. In any preceding example, additionally or optionally, weighted combination factor is estimated as a function of fuel usage and tailpipe emissions level during DPF regeneration for a plurality of future times over a time duration remaining in the current drive cycle, and wherein the first future time corresponds to a minimum value of the weighted combination factor. In any or all of the preceding examples, additionally or optionally, terminating DPF regeneration based on the ammonia storage level includes terminating regeneration in response to a modeled ammonia storage capacity at an end of the drive cycle being lower than a threshold ammonia level, the threshold ammonia level based on a predicted subsequent engine start. In any or all of the preceding examples, additionally or optionally, terminating DPF regeneration based on DPF soot load includes terminating the DPF regeneration is in response to a lower than second threshold soot load on the DPF, and wherein terminating DPF regeneration based on the modeled temperature of the exhaust urea injector is in response to a higher than threshold temperature of the exhaust urea injector, the second threshold soot load lower than the first threshold soot load.

In yet another example, an engine system, comprises a controller with computer readable instructions stored on non-transitory memory to: prior to a scheduled regeneration of a diesel particulate filter (DPF) coupled to an exhaust passage, adjust each of an urea injection limit for an urea injector coupled to the exhaust passage and an ammonia storage set point of a catalyst coupled to the exhaust passage, upstream or downstream of the DPF, initiate the scheduled regeneration of the DPF at a first time corresponding to a minimum weighted DPF regeneration factor, and terminate the regeneration of the DPF at a second time in response to a predicted ammonia storage capacity of the catalyst at an end of a current drive cycle being lower than a threshold and/or a lower than threshold soot load on the DPF. In any preceding example, additionally or optionally, adjustment of each of the urea injection limit and the ammonia storage set point includes increasing the urea injection limit while maintaining a current ammonia storage set point at a first time until initiation of the scheduled regeneration, and then decreasing each of the urea injection limit and the ammonia storage set point at a second time until initiation of the scheduled regeneration, the first time until initiation of the scheduled regeneration is longer than the second time until initiation of the scheduled regeneration. In any or all of the preceding examples, additionally or optionally, the weighted DPF regeneration factor is estimated as a function of each of an estimated fuel consumption to initiate and sustain the regeneration, an estimated fuel consumption due to soot load remaining on the DPF upon reaching the destination, an estimated level of NOx emissions during the regeneration, and an estimated level of $NH_3$ emissions during the regeneration.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
   selectively regenerating a diesel particulate filter (DPF) coupled to an exhaust passage based on one or more of a soot load, a predicted time to reach a destination, and a predicted ammonia level at a selective catalytic reduction (SCR) catalyst at the predicted time of reaching the destination
   wherein selectively regenerating based on the predicted ammonia level includes terminating DPF regeneration in response to the predicted ammonia level being lower than a threshold ammonia level, the threshold ammonia level based on a time to attain a light-off temperature of a SCR catalyst during an immediately subsequent engine start.

2. The method of claim 1, wherein selectively regenerating the DPF includes, in response to the soot load being higher than a first threshold soot load, scheduling regeneration of the DPF within a regeneration window.

3. The method of claim 2, wherein the regeneration window is within the predicted time to reach the destination, the regeneration window including a duration of time during which an estimated regeneration factor is lower than an estimated DPF fill factor.

4. The method of claim 3, wherein the estimated DPF fill factor is estimated based on each of an estimated fuel consumption corresponding to a change in exhaust back pressure with an increase in a soot load, a probability of forced regeneration, and a probability of partial regeneration.

5. The method of claim 3, wherein the estimated regeneration factor is estimated based on a fuel consumption to initiate DPF regeneration.

6. The method of claim 2, further comprising estimating a level of NOx emissions during DPF regeneration starting at a possible regeneration start time, and a level of $NH_3$ emissions during DPF regeneration starting at the possible regeneration start time, wherein the possible regeneration start time is one of a plurality of possible regeneration start times within the regeneration window.

7. The method of claim 6, further comprising estimating a weighted DPF regeneration factor corresponding to the possible regeneration start time and initiating DPF regeneration at a start time corresponding to a lowest estimated weighted DPF regeneration factor, the estimated weighted DPF regeneration factor based on each of an estimated fuel usage due to soot load remaining on the DPF upon reaching the destination, the estimated weighted DPF regeneration factor, the estimated level of NOx emissions, and the estimated level of $NH_3$ emissions.

8. The method of claim 1, wherein the predicted ammonia level is predicted using an ammonia storage model, the ammonia storage model based on DPF filter regeneration conditions including the soot load and an exotherm caused by burning of hydrocarbons and oxygen at the DPF.

9. The method of claim 1, wherein selectively regenerating includes terminating DPF regeneration in response to temperature of a urea injector upstream of the SCR catalyst being higher than a threshold temperature, the SCR catalyst coupled to the exhaust passage upstream or downstream of the DPF.

10. The method of claim 9, further comprising increasing a limit of urea injection via the urea injector at a first time and then decreasing the limit of urea injection at a second time, wherein the first time includes a first duration remaining for initiation of DPF regeneration and wherein the second time includes a second duration remaining for initiation of the DPF regeneration, the first duration longer than the second duration, the limit being applied to clip a generated urea injection amount greater than the limit to the limit.

11. The method of claim 10, further comprising decreasing an ammonia storage set point of the SCR catalyst at the second time.

12. The method of claim 1, wherein the predicted time to reach the destination is estimated based on vehicle operating conditions including vehicle speed, travel history of an operator, and a route information received from an external network cloud via a navigation system.

13. A vehicle method, comprising:
in response to a higher than first threshold soot load on a diesel particulate filter (DPF) coupled to an engine exhaust passage,
predicting each of a route, a vehicle speed profile, and a time remaining in a current drive cycle based on information received from one or more external sources;
scheduling initiation of a first DPF regeneration at a first future time, during the current drive cycle, based on a weighted combination factor of fuel usage and emissions level during the first DPF regeneration; and
terminating the first DPF regeneration based on one or more of DPF soot load, ammonia storage level at an exhaust catalyst, and a modeled temperature of an exhaust urea injector.

14. The method of claim 13, wherein weighted combination factor is estimated as a function of fuel usage and tailpipe emissions level during a DPF regeneration for a plurality of future times over a duration remaining in the current drive cycle, and wherein the first future time corresponds to a minimum value of the weighted combination factor.

15. The method of claim 13, wherein terminating the first DPF regeneration based on the ammonia storage level includes terminating regeneration in response to a modeled ammonia storage capacity at an end of the current drive cycle being lower than a threshold ammonia level, the threshold ammonia level based on a predicted subsequent engine start.

16. The method of claim 13, wherein terminating the first DPF regeneration based on DPF soot load includes terminating the DPF regeneration in response to a lower than second threshold soot load on the DPF, and wherein terminating the first DPF regeneration based on the modeled temperature of the exhaust urea injector is in response to a higher than threshold temperature of the exhaust urea injector, the second threshold soot load lower than the first threshold soot load.

17. An engine system, comprising:
a controller with computer readable instructions stored on non-transitory memory to:
prior to a scheduled regeneration of a diesel particulate filter (DPF) coupled to an exhaust passage, adjust each of an urea injection limit for an urea injector coupled to the exhaust passage and an ammonia storage set point of a catalyst coupled to the exhaust passage, upstream or downstream of the DPF;
initiate the scheduled regeneration of the DPF at a first time corresponding to a minimum weighted DPF regeneration factor; and
terminate the regeneration of the DPF at a second time in response to a one of a predicted ammonia storage capacity of the catalyst at an end of a current drive cycle being lower than a threshold and a soot load on the DPF being lower than another threshold,
wherein the weighted DPF regeneration factor is estimated as a function of each of an estimated fuel consumption to initiate and sustain the regeneration, an estimated fuel consumption due to soot load remaining on the DPF upon reaching a destination, an estimated level of NOx emissions during the regeneration, and an estimated level of $NH_3$ emissions during the regeneration.

18. The system of claim 17, wherein adjustment of each of the urea injection limit and the ammonia storage set point includes increasing the urea injection limit while maintaining a current ammonia storage set point at a first time until initiation of the scheduled regeneration, and then decreasing each of the urea injection limit and the ammonia storage set point at a second time until initiation of the scheduled regeneration, the first time until initiation of the scheduled regeneration is longer than the second time until initiation of the scheduled regeneration.

* * * * *